United States Patent
Boule

(10) Patent No.: US 6,237,627 B1
(45) Date of Patent: May 29, 2001

(54) AUXILIARY RESERVOIR TRANSFER SYSTEM FOR WINDSHIELD WASHER FLUID

(76) Inventor: Bernard R. Boule, 129 Jackson Road, Brome, Quebec (CA), J0E 1K0

( * ) Notice: Subject to any disclaimer, the term of this patent is extended or adjusted under 35 U.S.C. 154(b) by 0 days.

(21) Appl. No.: 09/358,873

(22) Filed: Jul. 22, 1999

Related U.S. Application Data

(60) Provisional application No. 60/094,086, filed on Jul. 24, 1998.

(51) Int. Cl.[7] ................................................. E03B 11/00
(52) U.S. Cl. ......................... 137/571; 239/284.1; 239/74
(58) Field of Search ................................. 239/284.1, 71, 239/72, 73, 74; 137/571

(56) References Cited

U.S. PATENT DOCUMENTS

| | | | | |
|---|---|---|---|---|
| 4,444,358 | * | 4/1984 | Spohn | 239/284.1 |
| 5,779,096 | * | 7/1998 | Cockfield | 239/284.1 |
| 5,810,247 | * | 9/1998 | Petroff | 239/284.1 |
| 5,853,025 | * | 12/1998 | Daneshvar | 239/284.1 |

FOREIGN PATENT DOCUMENTS

1073624 * 9/1954 (FR) ................................ 239/284.1

* cited by examiner

Primary Examiner—Andres Kashnikow
Assistant Examiner—Dinh Q. Nguyen
(74) Attorney, Agent, or Firm—Eric Fincham

(57) ABSTRACT

A secondary fluid delivery system for use in a vehicle having a windshield washer system which includes a primary fluid reservoir for supplying windshield washer fluid to a windshield, the secondary fluid delivery system comprising a cover designed to fit on a retail container of windshield washer fluid, conduits extending between the retail container and the primary fluid reservoir, a pump operatively connected to pump windshield fluid from the retail container to the primary fluid reservoir, and sensing means for sensing fluid levels both within the primary fluid reservoir and the retail container. The system may be provided in both manual and automatic modes, the manual mode being under the control of the vehicle operator to transfer fluid when required while with the automatic system, the transfer of fluid is automatically initiated. The system overcomes the dangerous situations wherein refilling is required on expressways or at night or in other dangerous or hazardous situations and also ensures that an adequate supply of windshield washer fluid is always available for use.

3 Claims, 1 Drawing Sheet

AUXILIARY RESERVOIR TRANSFER SYSTEM FOR WINDSHIELD WASHER FLUID

This appln claims the benefit of U.S. Provisional No. 60/094,086 filed Jul. 24, 1998.

The present invention relates to a fluid delivery system and more particularly, relates to improvements in automotive vehicle windshield washer systems.

BACKGROUND OF THE INVENTION

Modern motor vehicles typically include a windshield washer system wherein a windshield washer fluid reservoir is connected by suitable conduits to the inlet of a fluid pump. The outlet of the fluid pump is connected by hoses to nozzles which direct a stream of windshield washer fluid against the windshield of the motor vehicle. The windshield washer fluid may be directed through nozzles mounted on the hood of the vehicle or to nozzles within the windshield wipers themselves. The windshield washer fluid is usually an alcohol based system with cleansing agents to clean dirt, debris and insects from the windshield to provide better visibility. As such, the windshield washer system is a necessity to provide for safe operation of the vehicle and for the safety of the vehicle operator and passengers.

The windshield washer fluid reservoir is usually installed in the engine compartment of the motor vehicle by the manufacturer. When, during the normal course of operation, the supply of windshield washer fluid becomes depleted, the reservoirs must be refilled manually to replenish the supply of windshield washer fluid. This may either be done by the vehicle operator or at a service station by physically accessing the fluid reservoir and pouring fluid into it. The fluid is normally sold in what might be referred to as a retail container and which retail container is usually of a volume sufficient to refill the fluid reservoir one or more times.

In order to access the windshield fluid reservoir, it is usually necessary to open the engine compartment of the vehicle, locate the proper reservoir, remove its lid or cap and then pour the windshield washer fluid from the retail container into the fluid reservoir through an opening. Subsequently, it is necessary to replace the lid or cap. This process is time consuming and awkward. The windshield fluid reservoir lids or caps are often difficult to remove and it is not always easy to identify which is the windshield fluid reservoir—it can, for example, easily be confused with the reservoir for antifreeze to the vehicle.

A major problem associated with the windshield washer system is that the refilling is often required on an expressway or at night or in an unfamiliar area and this can render the task more difficult and possibly even hazardous. The necessity of refilling the windshield fluid reservoir usually happens at times when the fluid is being actively used such as in conditions where a lot of grime is being thrown on the windshield from the road due to adjacent vehicles. In particular, in somewhat colder climates, a mixture of cold water and road grime can be thrown on the windshield which necessitates very frequent cleaning of the windshield in order to maintain adequate visibility. Such conditions frequently occur on expressways where no stopping or only very limited stopping is available. As such, it becomes extremely dangerous as the driver whose windshield washer fluid has been depleted is forced to try to operate the vehicle with very limited visibility.

Furthermore, the difficulty of opening the engine compartment, removing the cap or lid of the windshield fluid reservoir and attempting to pour fluid from one container into a relatively small opening can result in damage to personal property and clothing as well as waste and pollution due to spillage.

SUMMARY OF THE INVENTION

It is therefore an object of the present invention to provide for an improvement in a vehicle wherein there is provided a secondary fluid delivery system for use with a retail container of windshield washer fluid.

According to one aspect of the present invention, in a vehicle having a windshield washer system including a primary fluid reservoir for supplying windshield washer fluid to a windshield, there is provided the improvement which comprises a secondary fluid delivery system for use with a retail container of washer fluid, the secondary fluid delivery system comprising cover means designed to fit on the retail container of washer fluid, conduit means extending between the retail container and the primary fluid reservoir, pump means operatively connected to the conduit means to pump windshield fluid from the retail container to the primary fluid reservoir, first sensing means for sensing a fluid level within the primary fluid reservoir, and second sensing means for sensing a fluid level within the retail container.

In a preferred embodiment, the first sensing means includes both a low fluid level sensor and a high fluid level sensor while the second sensing means would include a low fluid level sensor to detect a low level of fluid in the retail container and an empty sensor for sensing when the retail container is empty—i.e. when there is not sufficient fluid to pump to the primary fluid reservoir. The system may be arranged to have both manual and automatic modes—the manual mode including a control pad wherein the operations are initiated by the operator of the vehicle and the control pad will thus have suitable controls and visual status indicators. In an automatic mode, the pump will automatically operate when fluid is required and this would be reflected on a status panel providing visual indicating means when the pump is operating and for one or more fluid levels.

The retail container may be mounted anywhere in the vehicle which is convenient for access thereto. Examples would be in the trunk or passenger compartment of the vehicle.

Most of the retail containers presently available on the market have screw caps which are screw threadably engageable with threads on the neck of the retail container, which neck surrounds the dispensing aperture thereof. The fluid delivery system of the present invention may incorporate different caps which are sized for the various retail containers on the market. Alternatively, one could use a frustraconically shaped plug member which would be adapted to fit within the dispensing aperture and as such, could be sized to fit a variety of different retail containers.

The pump is preferably mounted proximate to the auxiliary reservoir. A pump unit could be enclosed in a suitable structure to include the pump, the electronic control device and connecting tubing and wiring. Preferably, the inlet of the pump is connected to the pickup unit and the pickup unit may be formed of a rigid tubing which passes through a bushing or the like which may be formed in the cap or other device connected to the retail container. The bushing may have an aperture therein through which the electrical conductor passes to provide power and a signal return for the fluid sensors. The sensors are connected by means of an electrical conductor to the control device in the pump unit using an appropriate plug. The sensors are designed to send signals concerning the level of or absence of fluid in the retail container.

The control device per se is preferably an electronic control device and it is well within the skill of those knowledgeable in the art to manufacture such a device to perform the functions set forth herein.

In a manual mode, there is provided a control pad for controlling the operation of the system. The control pad will be connected to the control device in the pump by means of a suitable electrical conductor which is attached to the control device by a plug. The control device provides power to the control pad and the on/off switch and which in turn provides power to the pump motor in the pump unit and the sensors for both the first and second sensing means.

Preferably, a plurality of light emitting diodes are used as visual indicating devices. Preferably, each LED is of a different color, examples of which are given below. Thus, when the on/off switch is placed in the on position, a small red LED on the control panel may be lit to provide evidence that there is power to the pump unit and that the sensors are on. A green LED would indicate that the sensor in the retail container detects that there is sufficient fluid therein if a transfer is required. Thus, when extinguished, the sensor will not light to indicate that there is insufficient fluid to make a significant transfer. A yellow LED may be used to indicate that the pump motor is activated and transferring fluid to the primary fluid reservoir. The process may be initiated by a start button, which when depressed and released by the vehicle operator, causes the pump motor to engage.

In an automatic mode, only the status indicators, comprising the LEDs, are present as when the low level sensor in the primary fluid reservoir detects a low level therein, the pump is automatically activated by the control device to pump fluid.

It will be understood that the system described herein may be utilized with other fluids in the vehicle, each fluid being provided with an appropriate retail container of the same. Exemplary of such fluids would be an antifreeze solution, brake fluids, etc.

BRIEF DESCRIPTION OF THE DRAWINGS

Having thus generally described the invention, reference will be made to the accompanying drawing illustrating an embodiment thereof, in which.

DESCRIPTION OF THE PREFERRED EMBODIMENTS

Figure 1:
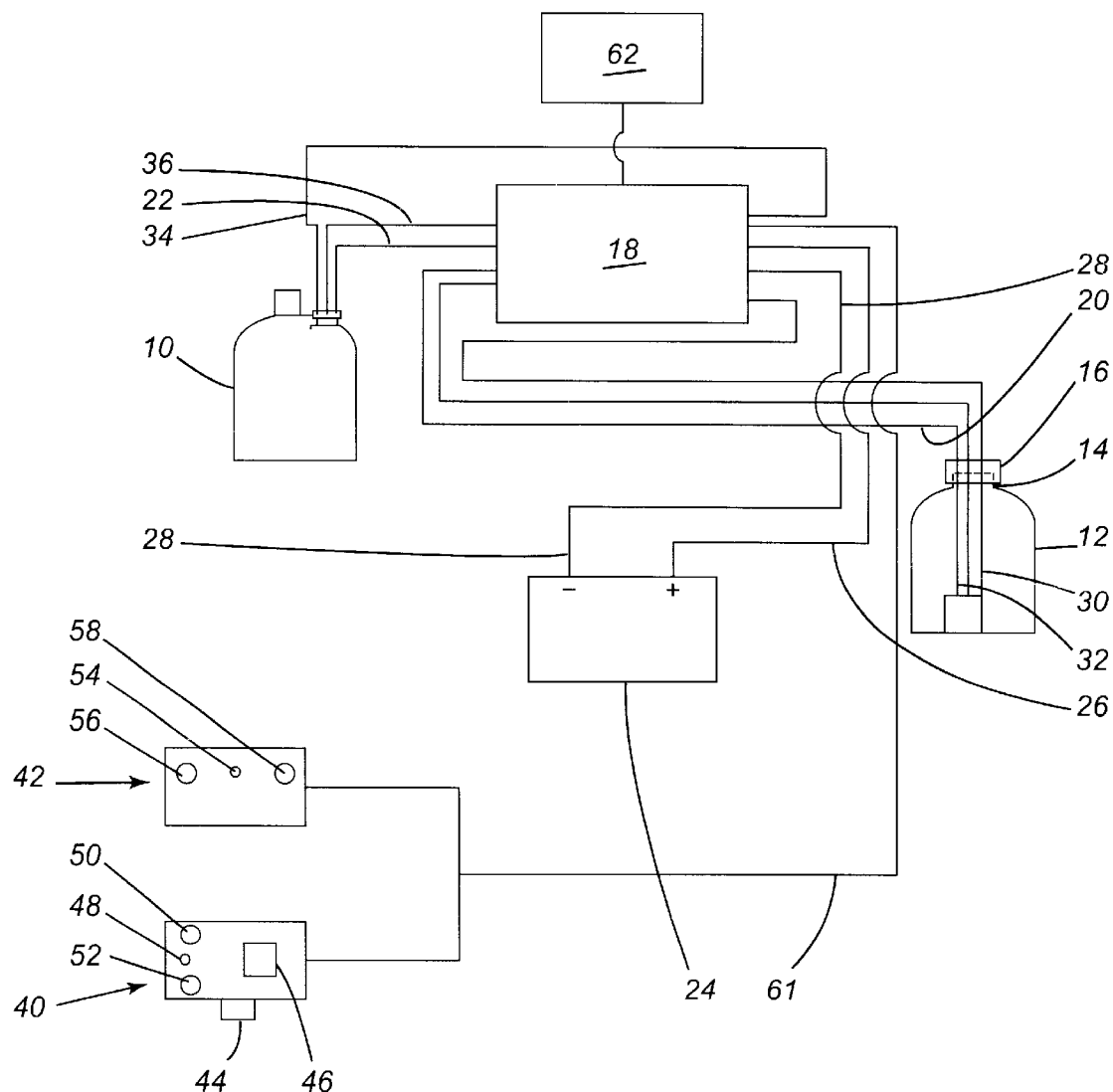
FIG. 1 is a schematic view of the secondary windshield washer fluid delivery system according to embodiments of the present invention.

Turning to the drawing in greater detail and by reference characters thereto, there is illustrated schematically a secondary windshield washer fluid delivery system designed to be used with a conventional primary windshield washer fluid reservoir generally designated by reference numeral 10. Primary fluid reservoir 10 is that windshield washer fluid reservoir normally found in the engine compartment of a vehicle. Reservoir 10 may be attached to the vehicle by any suitable means.

According to the present invention, there is provided a windshield washer fluid retail container which is generally designated by reference numeral 12. Retail container 12 may be any conventional retail container of windshield washer fluid and may be suitably mounted at a convenient point in the vehicle—typically, in the trunk of the vehicle or in the passenger compartment. Such retail containers 12 normally have a threaded neck structure 14. A cap or cover 16 is designed to be placed on neck 14 in a conventional manner.

A fluid conduit 20 passes through cover 16 and interconnects retail container 12 and a pump 18. Exiting from the outlet side of pump 18 is a further fluid conduit 22 which is designed to pump fluid to windshield washer fluid reservoir 10.

Pump unit 18 receives power from the vehicle battery 24 by means of a first cable 26 connecting with the positive terminal of battery 24 and a second cable 28 connecting with the negative terminal of battery 24.

The retail container is provided with a low level sensor and associated wire 30 and an empty level sensor and wire 32.

Primary windshield washer fluid reservoir 10 includes a low level sensor and wire 34 and a high level sensor and wire 36.

Depending on the model, the delivery system may include either a control pad 40 or a status panel 42.

Control pad 40 is designed to be used in the manual model and to this end, control pad 40 may include an on/off switch 44, a start switch 46 along with visual indicating means comprising a first red LED 48, a second green LED 50, and a third yellow LED 52.

For an automated system, there is merely provided a status panel 42 which may also have thereon visual indicating means comprising a red LED 54, a green LED 56, and a yellow LED 58.

The fluid delivery system also has, associated with pump 18, a control device or circuit 62 for controlling and implementing the various programs described hereinbelow.

Operation of the fluid delivery system will depend on whether the system is a manual or automatic model. Thus, in the fully automatic mode, the low sensor 34 in the windshield washer fluid reservoir sends a signal indicating the low level thereof, and provided that sensor 32 detects sufficient fluid in retail container 12, control circuit or device 62 initiates the operation of pump 18 to transfer fluid from the retail container 12 to reservoir 10. Subsequently, when detector 36 detects a sufficient level of fluid in reservoir 10, the transfer is terminated.

In the manual mode, pad 40 is utilized to manually initiate the transfer.

The present system provides a convenient way of filling the windshield washer fluid reservoir at any time that refilling is required, without having to directly access the reservoir under the hood of the vehicle. It thus permits the operator to maintain good visibility and safe operation of the vehicle. It overcomes the problem of depletion of fluid in the reservoir at inopportune times such as on expressways, areas unfamiliar to the vehicle operator, in severe weather, at night or other instances where stopping and exiting the vehicle may be unsafe or hazardous, and at times when one is not able to obtain a supply of windshield washer fluid.

It will be understood that the above described embodiments are for purposes of illustration only and that changes and modifications may be made thereto without departing from the spirit and scope of the invention.

What is claimed is:

1. In a vehicle having a windshield washer system including a primary fluid reservoir for supplying windshield washer fluid to a windshield, the improvement comprising a secondary delivery system for use with a retail contender of washer fluid, said secondary fluid delivery system consisting of:

cover means for said retail container of washer fluid;

a conduit extending between said retail container and said primary reservoir;

a pump operatively connected to said conduit to pump windshield fluid from said retail container to said primary fluid reservoir;

a first sensor for sensing a low fluid level within said primary fluid reservoir;

a second separate sensor for sensing a high fluid level within said primary fluid reservoir;

a third sensor for sensing a low fluid level within said retail container;

a fourth sensor for sensing when said retail container is empty;

a control pad having a switch operative to turn said pump on and off, a start switch for initiating transfer of said windshield washer fluid from said retail container to said primary fluid reservoir, and three LED's to indicate status, of said system, a first one of said LED's indicating when said pump is operating, a second one of said LED's showing a power supply to said pump means, and a third one of said LED's showing a sufficient level of fluid in said rail container.

2. The improvement of claim 1 further including a status panel, said status panel having visual indicating means.

3. The improvement of claim 1 wherein said visual indicating means comprise LED's.

* * * * *